United States Patent [19]

Fukami et al.

[11] Patent Number: 4,794,883

[45] Date of Patent: Jan. 3, 1989

[54] DUAL RESERVOIR TANK FOR PROPELLANT HYDRAULIC FLUID FOR INTERNAL COMBUSTION ENGINE HYDRAULICALLY DRIVEN COOLING FAN AND FOR POWER STEERING ACTUATING FLUID

[75] Inventors: Kashirou Fukami, Toyota; Masao Inagaki, Okazaki; Seiji Oomura, Toyota; Tooru Hamamoto, Okazaki, all of Japan

[73] Assignee: Toyota Jidosha Kabushiki Kaisha, Aichi, Japan

[21] Appl. No.: 116,339

[22] Filed: Nov. 4, 1987

[30] Foreign Application Priority Data

Nov. 12, 1986 [JP] Japan ............................ 61-173753[U]

[51] Int. Cl.$^4$ .............................................. F01P 5/04
[52] U.S. Cl. .................................... 123/41.12; 165/39
[58] Field of Search ................. 165/39, 32; 123/41.12, 123/41.05, 41.49

[56] References Cited

U.S. PATENT DOCUMENTS

| | | | |
|---|---|---|---|
| 3,664,129 | 5/1972 | Schwab | 60/53 R |
| 4,179,888 | 11/1979 | Goscenski, Jr. | 60/420 |
| 4,223,646 | 9/1980 | Kinder | 123/41.11 |
| 4,377,989 | 3/1983 | Tholen | 123/41.12 |
| 4,414,809 | 11/1983 | Burris | 60/424 |
| 4,570,849 | 2/1986 | Klaucke et al. | 236/35 |

FOREIGN PATENT DOCUMENTS

| | | |
|---|---|---|
| 49-40135 | 4/1974 | Japan . |
| 56-83630 | 7/1981 | Japan . |
| 58-13119 | 1/1983 | Japan . |

Primary Examiner—Raymond A. Nelli
Attorney, Agent, or Firm—Kenyon & Kenyon

[57] ABSTRACT

In an automotive vehicle wherein the cooling fan for the internal combustion engine is driven hydraulically by a flow of a first propellant hydraulic fluid, while the power steering device for the steering system is driven hydraulically by a flow of a second propellant hydraulic fluid, reservoirs for storing the first and second propellant hydraulic fluids are provided as first and second tank portions, respectively, of a common reservoir tank, so that the first propellant hydraulic fluid which is more apt to be heated up by friction loss is cooled down by the second propellant hydraulic fluid which remains at ambient temperature as effectively cooled through the power steering fluid circulation system.

5 Claims, 2 Drawing Sheets

DUAL RESERVOIR TANK FOR PROPELLANT HYDRAULIC FLUID FOR INTERNAL COMBUSTION ENGINE HYDRAULICALLY DRIVEN COOLING FAN AND FOR POWER STEERING ACTUATING FLUID

BACKGROUND OF THE INVENTION

The present invention relates to a reservoir tank for storing a reserve of propellant hydraulic fluid for a hydraulically driven cooling fan for an internal combustion engine and also a reserve of actuating fluid for a power steering system in an automotive vehicle, and more particularly relates to a dual type reservoir tank for the abovementioned two purposes which provides intercooling between said two fluid reserves, so as to be able to provide adequate cooling for said cooling fan propellant hydraulic fluid.

It is already known as shown, for example in, Japanese Utility Model Laying Open Publication No. 47-29026 (1972) and in Japanese Patent Laying Open Publication No. 58-13119 (1983) to propel a cooling fan for an internal combustion engine of an automotive vehicle or the like by a hydraulic motor.

However, there is a problem with regard to such a hydraulic motor driven engine fluid for the hydraulic motor rises at a relatively high operating temperature, since its viscosity is thereby reduced, the efficiency of the cooling fan motor is deteriorated, and the rotational speed of the cooling fan drops, and the internal combustion engine may not be properly cooled. Accordingly, conventionally there has been provided a cooling device in the hydraulic circuit for the propellant hydraulic fluid for the motor for the cooling fan. However, the provision of such a cooling device increases the flow resistance of this hydraulic circuit and therefore the pressure losses therein, and accordingly in any case deteriorates the efficiency of the system as a whole. Further, the piping work for the system is increased in complexity, and the system occupies more space within the engine room of the automotive vehicle; and, as a matter of course, costs are increased.

SUMMARY OF THE INVENTION

The inventors of the present invention have considered such problems in the system for hydraulically driving a cooling fan for an internal combustion engine, and have considered various possibilities for improvement thereof.

Accordingly, it is the primary object of the present invention to provide an improved reservoir tank for storing a reserve of propellant hydraulic fluid for a hydraulically driven cooling fan for an internal combustion engine of an automotive vehicle, which, when incorporated in such a system, avoids the above-mentioned problems.

It is a further object of the present invention to provide such a reservoir tank which can effectively minimize changes of the operating temperature of the propellant hydraulic fluid for the cooling fan.

It is a further object of the present invention to provide such a reservoir tank which eliminates any requirement for the use of any cooler for the propellant hydraulic fluid for said cooling fan.

It is a further object of the present invention to provide such a reservoir tank which enables the piping work for the system as a whole to be made as simple as in practicable.

It is a further object of the present invention to provide such a reservoir tank which enables the system as a whole to be made as compact as is practicable.

It is a further object of the present invention to provide such a reservoir tank which enables the system as a whole to be made as cheap as is practicable.

It is a further object of the present invention to provide such a reservoir tank which provides a measure of fail safe operation.

According to the most general aspect of the present invention, these and other objects are attained by, for an automotive vehicle comprising a cooling fan for an internal combustion engine, said cooling fan being driven hydraulically by a first flow of a first propellant hydraulic fluid, and a power steering device adapted to be driven hydraulically by a second flow of a second propellant hydraulic fluid; a reservoir tank comprising: (a) a first reservoir tank portion for storing a reserve of said first propellant hydraulic fluid, said first flow being taken from said first reservoir tank portion and being returned to said first reservoir tank portion; and (b) a second reservoir tank portion directly adjacent said first reservoir tank portion for storing a reserve of said second propellant hydraulic fluid, said second flow being taken from said second reservoir tank portion and being returned to said second reservoir tank portion.

According to such a reservoir tank, when the temperature of the cooling fan hydraulic fluid in the first tank portion becomes elevated during vehicle operation, as is typical, heat transfer from this cooling fan hydraulic fluid to the power steering hydraulic fluid in the second tank portion which typically remains relatively cool allows of said cooling fan hydraulic fluid being advantageously cooled down. Accordingly, changes of the operating temperature of the propellant hydraulic fluid for the cooling fan are effectively minimized, and it is ensured that the rotational speed of the cooling fan can be always properly and stably set to the target rotational speed therefor, while the risk is minimized of said rotational speed of said fan coming to be too low for the currently prevailing operational circumstances which would run a risk of not providing sufficient cooling effect for the engine. Further, the risk of unduly deteriorating engine or fan operational efficiency is minimized, and yet the piping work for the system as a whole is enabled to be made as simple as is prcticable, and no cooler or the like for the propellant hydraulic fluid for the cooling fan is required; thus the advantages of simplicity and of compactness are made available, and cost is reduced.

According to a particular embodiment of the present invention, said first and second reservoir tank portions may be completely separated by a dividing wall having a substantial heat conductivity. In this case, the reserves of propellant hydraulic fluid in said first and second reservoir tank portions are always completely isolated from one another, while heat transfer is still allowed between them, so that it becomes possible to utilize two different types of propellant hydraulic fluid for the two different propellant hydraulic fluid circuits. On the other hand, as an alternative embodiment of the present invention, said first and second reservoir tank portions may be separated by a dividing wall extending between said two reservoir tank portions only for lower portions thereof. In this case it is necessary for the type of propellant hydraulic fluid utilized in the two different propellant hydraulic fluid circuits to be the same. Or, said first and second reservoir tank portions may be separated by a dividing wall formed with a through opening at a middle portion thereof and having a substantial heat conductivity.

Further, according to a further modification of the present invention, a plurality of fins are fixed to said dividing wall. This aids with good heat transfer through said dividing wall.

Further, there may be provided means for allowing propellant hydraulic fluid to be filled into said first reservoir tank portion and means for allowing propellant hydraulic fluid to be filled into said second reservoir tank portion, and these means may be separate and independent from one another or may be of a common structure.

BRIEF DESCRIPTION OF THE DRAWINGS

The prsent invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, like reference symbols, unless otherwise so specified, denote like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

Figure 1:
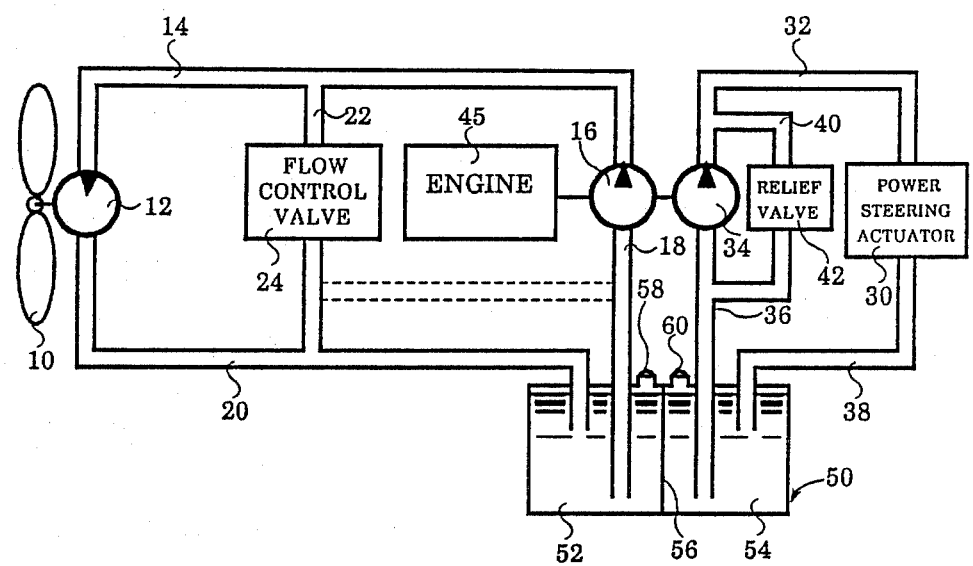
FIG. 1 is a schematic view showing a system for hydraulically driving a cooling fan for an internal combustion engine and a system for power driving device for an automotive vehicle, said systems incorporating a first preferred embodiment of the reservoir tank according to the present invention for storing a reserve of propellant hydraulic fluid for the cooling fan and a reserve of propellant hydraulic fluid for the power driving.

Referring to FIG. 1, the reference numeral 45 denotes an internal combustion engine, typically fitted to an automotive vehicle such as a passenger car, which is equipped with a radiator which is not particularly shown. A cooling fan 10 is provided for blowing a stream of air at this radiator, and this cooling fan 10 is rotationally driven by a hydraulic motor 12. This hydraulic motor 12 is of a per se conventional type, and, as is typical, fails to provide a required torque if the temperature of the propellant hydraulic fluid supplied thereto raises above a certain value.

The intake port of this hydraulic motor 12 is connected by a hydraulic conduit 14 to the output port of a hydraulic fluid pump 16 which is rotationally driven by the engine 45. The pump 16 is provided with a built in relief valve (not shown in the drawings) so as to restrict its output pressure not to exceed a determinate value. And the intake port of the pump 16 is connected by a hydraulic conduit 18 to a chamber 52 of a reservoir tank 50 forming a first portion thereof for storing a reserve of propellant hydraulic fluid for driving the hydraulic motor 12, and sucks up and receives a supply of hydraulic fluid therefrom. Further, the outlet port of the hydraulic motor 12 is connected by another hydraulic conduit 20 to this chamber 52 of said reservoir tank 50, so as to return spent hydraulic fluid to said chamber 52.

An intermediate point along the hydraulic conduit 14 is connected to an intermediate point along the hydraulic conduit 20 via a bypass conduit 22 which has a flow control valve 24 provided at an intermediate point therealong. The flow control valve 24 operates according to a control signal such as an electrical control signal which is supplied from a control device which is not particularly shown in the figure, so as to allow more or less flow of hydraulic fluid through the bypass conduit 22 and to control the flow rate of the hydraulic fluid supplied as propellant to the hydraulic motor 12, and thus controlling the rotational speed of said hydraulic motor 12.

A power steering actuator device 30 is provided for aiding with the movement of the steering system of the vehicle not particularly shown. This power steering actuator device 30 is of a per se conventional type, and, as is typical, is provided with power hydraulically by being supplied at its intake port with a flow of pressurized propellant hydraulic fluid. Thus, the intake port of this power steering actuator device 30 is connected by a hydraulic conduit 32 to the output port of a power steering pump 34 which is rotationally driven by the engine 45, in a duplex fashion with the previously described hydraulic fluid pump 16 for the hydraulic motor 12 for the cooling fan 10. And the intake port of this power steering pump 34 is connected by a hydraulic conduit 36 to a chamber 54 of the reservoir tank 50 forming a second portion thereof for storing a reserve of porpellant hydraulic fluid for power steering, and sucks up and receives a supply of hydraulic fluid therefrom. Further, the outlet port of the power steering actuator device 30 is connected by another hydraulic conduit 38 to this chamber 54 of the reservoir tank 50, so as to return spent hydraulic fluid to said chamber 54. Further, an intermediate point along the hydraulic conduit 32 is connected to an intermediate point along the hydraulic conduit 36 via a bypass conduit 40 which has a relief valve 42 provided at an intermediate point therealong, so as to restrict the output pressure of said power steering pump 34 not to exceed a determinate value.

Thus, the reservoir tank 50 comprises two tank portions for reserving the cooling fan propellant hydraulic fluid and the power steering device propellant hydraulic fluid, said two tank portions being, in this first preferred embodiment, completely separated from one another by a dividing wall 56 having a substantial heat conductivity. And in the top defining lid member of this reservoir tank 50, on the side of the chamber 52, there is provided a cooling fan propellant hydraulic fluid inlet aperture 58 provided with a covering cap; while, similarly, in said top defining lid member of said reservoir tank 50, on the side of the chamber 54, there is provided a power steering propellant hydraulic fluid inlet aperture 60 also provided with a covering cap. Thereby, if the supply of propellant hydraulic fluid for the hydraulic motor 12 should become depleted, additional such propellant hydraulic fluid can be supplied to the chamber 52 through the aperture 58; while, similarly, if the supply of propellant hydraulic fluid for the power steering actuator device 30 should become depleted, additional such propellant hydraulic fluid can be supplied to the chamber 54 through the aperture 60.

During engine operation, the flow of propellant hydraulic fluid for the hydraulic motor 12 is progressively heated up due to frictional losses principally in the hydraulic fluid pump 16 and the hydraulic motor 12, and accordingly the accumulation of such propellant hydraulic fluid in the chamber 52 becomes progressively heated up. On the other hand, in the hydraulic power steering system the flow of propellant hydraulic fluid meets no substantial resistance during operation of the vehicle for a major portion of the time when the steering angle of the vehicle is only slightly changed, and a substantial alteration of the steering angle which applies a substantial resistance to the flow of the propellant hydraulic fluid is only performed for a relatively minor portion of the time. Accordingly, by substantially no flow resistance continuous recirculations of the hydraulic fluid through the power steering actuator device 30, the power steering device propellant hydraulic fluid is generally constantly maintained at the same temperature as the power steering actuator device 30 and the conduits 32 and 38 under the temperature equilibrium therebetween.

Thus, by the chamber 52 for storing the cooling fan propellant hydraulic fluid and the chamber 54 for storing the power steering device propellant hydraulic fluid being constituted as directly adjacent portions of the same reservoir tank 50, as separated from one another by the substantially heat conductive dividing wall 56, heat exchange is performed through said dividing wall 56 between the fluids stored in these two chambers 52 and 54, the accumulation of propellant hydraulic fluid in the chamber 52 being cooled, while on the other hand the accumulation of propellant hydraulic fluid in the chamber 54 is heated up. The heat transferred to the propellant hydraulic fluid for the power steering actuator device 30 is dissipated to the atmosphere through the continuous recirculation of the hydraulic fluid through the power steering actuator 30 via the cool structure of the power steering actuator, without substantially raising the temperature of the hydraulic fluid in the hydraulic power steering system.

As suggested by dashed lines in FIG. 1, it would be possible for the downstream side of the bypass conduit 22 to be connected, not to the conduit 20, but instead to the conduit 18, so as directly to resupply the hydraulic fluid to the pump 16. In this case, this flow of propellant hydraulic fluid through the bypass conduit 22 is not cooled by heat exchange with the power steering propellant hydraulic fluid stored in the chamber 54; but, since this flow of propellant hydraulic fluid through the bypass conduit 22 has not been passed through the hydraulic motor 12 and accordingly has not been greatly heated up by frictional losses, no problem will thereby be caused.

In this shown first preferred embodiment, the chamber 52 for storing the cooling fan propellant hydraulic fluid and the chamber 54 for storing the power steering device propellant hydraulic fluid are completely separated from one another by the dividing wall 56, i.e. are not communicated to one another at all, and accordingly two different types of propellant hydraulic fluid may be used for the hydraulic motor 12 and for the power steering actuator device 30. This also ensures that, even if one of the two propellant hydraulic fluid circuits should develop a leak, the other will not be disturbed by loss of hydraulic fluid. Accordingly, this first preferred embodiment provides a measure of fail safe operation.

Figure 2:
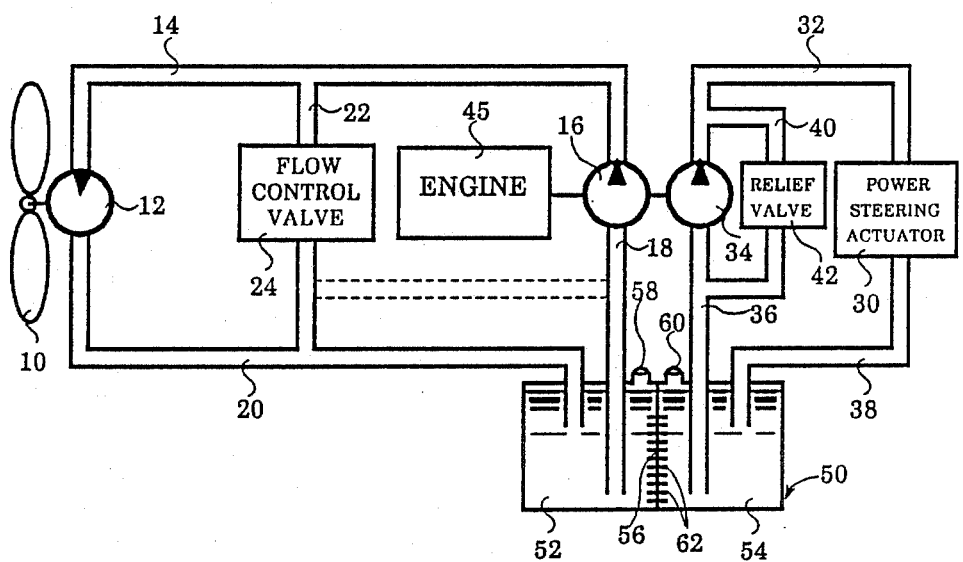
FIG. 2 is a view similar to FIG. 1, showing a second preferred embodiment of the reservoir tank according to the present invention.

FIG. 2 shows the second preferred embodiment of the present invention. In this second preferred embodiment, the only difference from the first preferred embodiment described above is that the dividing wall 56 is fitted with a number of protruding fins 62, for aiding with heat transfer from the propellant hydraulic fluid for the hydraulic motor 12 to the propellant hydraulic fluid for the power steering actuator device 30 through the dividing wall 56. Thus the benefits of the first preferred embodiment of the present invention, described above, are made available in even greater measure.

The same alteration to the conduit system as described in the case of the first preferred embodiment and as illustrated by the dashed lines in FIG. 1, may be made in this second preferred embodiment also, as similarly illustrated by the dashed lines in FIG. 2.

Figure 3:
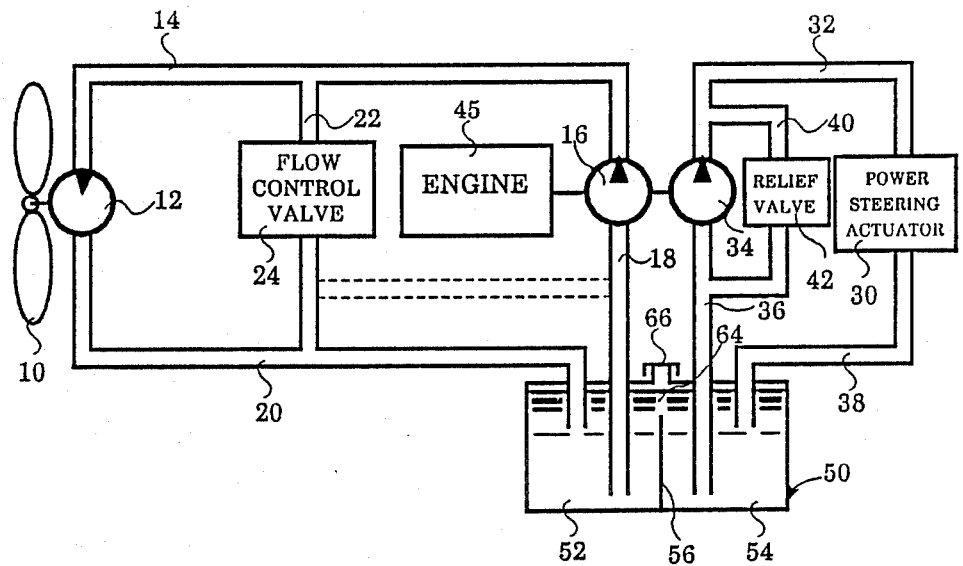
FIG. 3 is a view similar to FIGS. 1 and 2, showing a third preferred embodiment of the reservoir tank according to the present invention.

FIG. 3 shows the third preferred embodiment of the present invention. In this third preferred embodiment, the difference from the first preferred embodiment described above is that the dividing wall 56 does not completely separate the chamber 52 for the cooling fan propellant hydraulic fluid and the chamber 54 for the power steering device propellant hydraulic fluid from one another. In detail, the dividing wall 56 is connected with the bottom surface of the reservoir tank 50 and with the lower portions of opposing side walls of said reservoir tank 50, but does not extend as far up said opposing side walls of said reservoir tank 50 to reach the top portion of said reservoir tank 50; thus, there remains an opening or gap 64 between the upper edge portion of said dividing wall 56 and said upper or top portion of said reservoir tank 50. In other words, the upper portions of the chamber 52 and of the chamber 54 are communicated together over the dividing wall 56 through this opening or gap 64, and accordingly, provided that both the level of the propellant hydraulic fluid in said chamber 52 and also the level of the propellant hydraulic fluid in said chamber 54 are above the level of the upper edge portion of the dividing wall 56, then said propellant hydraulic fluid in said chamber 52 and said propellant hydraulic fluid in said chamber 54 can mix. Accordingly, in this case, it is necessary that the propellant hydraulic fluid for the hydraulic motor 12 should be the same type of fluid as the propellant hydraulic fluid for the power steering actuator device 30. In this third preferred embodiment, because heat exchange between the propellant hydraulic fluid for the hydraulic motor 12 and the propellant hydraulic fluid for the power steering actuator device 30 is available, not only by conductive heat transmission through the dividing wall 56, but also by direct mixing between said two propellant hydraulic fluids, thereby the effectiveness of said heat exchange is favorably enhanced, as compared to the effectiveness of the first and the second preferred embodiments of the reservoir tank of the present invention which only provided said heat exchange by means of conductive heat transmission through the dividing wall 56, and not by direct mixing.

It should be noted that, since the lower portions of the chamber 52 and of the chamber 54 are not directly communicated together, but are separated by the dividing wall 56, as in the case of the first and second preferred embodiments shown above, even if one of the two propellant hydraulic fluid circuits should develop a leak, the other will not be very significantly disturbed by loss of hydraulic fluid, and particularly, even if one such propellant hydraulic fluid circuit should become totally emptied of hydraulic fluid, the other such propellant hydraulic fluid circuit will still be enabled of performing its function.

An advantage that accrues with this third preferred embodiment is that, as shown in FIG. 3, only one inlet aperture 66 is required to be provided for refilling both the cooling fan propellant hydraulic fluid reservoir chamber 52 and the power steering device propellant hydraulic fluid reservoir chamber 54 with their common hydraulic fluid. This is a notable advantage in simplicity, as compared to the case in the first and the second preferred embodiments, in which it was necessary to provide both the cooling fan propellant hydraulic fluid inlet aperture 58 and also the power steering propellant hydraulic fluid inlet aperture 60.

The same alteration to the conduit system as described in the cases of the first and second preferred embodiments and as illustrated by the dashed lines in FIGS. 1 and 2, may be made in this third preferred embodiment also, as similarly illustrated by the dashed lines in FIG. 3.

Figure 4:
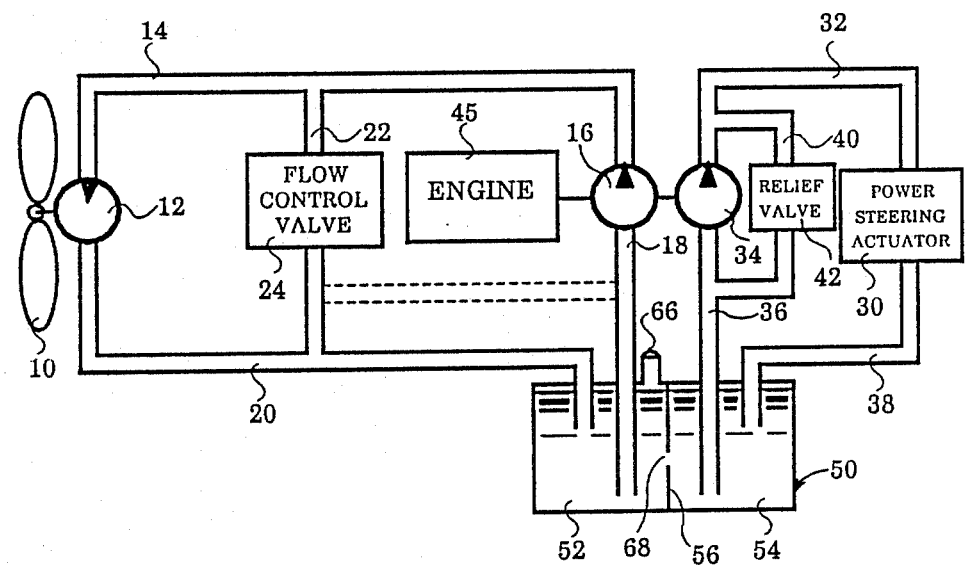
FIG. 4 is a view similar to FIGS. 1 through 3, showing a fourth preferred embodiment of the reservoir tank according to the present invention.

FIG. 4 shows a fourth preferred embodiment of the present invention. In this fourth preferred embodiment, the difference from the third preferred embodiment described above is that the aperture through the dividing wall 56, which communicates together the chamber 52 for storing the cooling fan propellant hydraulic fluid and the chamber 54 for storing the power steering device propellant hydraulic fluid from one another, is provided as a hole 68 positioned on at a middle portion in the vertical direction. Accordingly, provided that both the level of the propellant hydraulic fluid in said chamber 52 and also the level of the propellant hydraulic fluid in said chamber 54 are above the level of the lower edge portion of this hole 68, then said propellant hydraulid fluid in said chamber 52 and said propellant hydraulic fluid in said chamber 54 can mix. Accordingly, as in the case of the third preferred embodiment of the present invention, in the case of this fourth preferred embodiment it is again necessary that the propellant hydraulic fluid for the hydraulic motor 12 should be the same type of fluid as the propellant hydraulic fluid for the power steering actuator device 30. In this fourth preferred embodiment, again, because heat exchange between the propellant hydraulic fluid for the hydraulic motor 12 and the propellant hydraulic fluid for the power steering actuator device 30 is available, not only by conductive heat transmission through the dividing wall 56, but also by direct mixing between said two propellant hydraulic fluids, the effectiveness of said heat exchange is favorably enhanced, as compared to the effectiveness of the first and the second preferred embodiments of the present invention which only provide said heat exchange by means of conductive heat transmission through the dividing wall 56, and not by direct mixing.

It should be noted that the lower edge of the hole 68 in the dividing wall 56 should be positioned as sufficiently high up with relation to the chambers 52 and 54 to be above the minimum acceptable levels for stored propellant hydraulic fluid in these two chambers. This will ensure that, as in the case of the first through the third preferred embodiments shown above, even if a first one of the two propellant hydraulic fluid circuits should develop a leak, the other such propellant hydraulic fluid circuit will not be very significantly disturbed by loss of hydraulic fluid therefrom.

An advantage that accrues with this fourth preferred embodiment is again that, as shown in FIG. 4, only one inlet aperture 66 is required to be provided for refilling both the chambers 52 and 54 with their common hydraulic fluid.

The same alteration to the conduit system as described in the cases of the first through the third preferred embodiments and as illustrated by the dashed lines in FIGS. 1 through 3, may be made in this fourth preferred embodiment also, as similarly illustrated by the dashed lines in FIG. 4.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. In an automotive vehicle having a cooling fan for an internal combustion engine, said cooling fan being driven hydraulically by a first flow of a first propellant hydraulic fluid, and a power steering device adapted to be driven hydraulically by a second flow of a second propellant hydraulic fluid,
   a reservoir tank comprising a dividing wall between:
   (a) a first reservoir tank portion for storing a reserve of said first propellant hydraulic fluid, said first flow being taken from said first reservoir tank portion and being returned to said first reservoir tank portion; and
   (b) a second reservoir tank portion directly adjacent said first reservoir tank portion for storing a reserve of said second propellant hydraulic fluid, said second flow being taken from said second reservoir tank portion and being returned to said second reservoir tank portion.

2. A reservoir tank according to claim 1, wherein said dividing wall completely separates said first reservoir tank portion from said second reservoir tank portion, said dividing wall having a substantial heat conductivity.

3. A reservoir tank according to claim 1, wherein said dividing wall separates said first reservoir tank portion from said second reservoir tank portion only for lower portions thereof.

4. A reservoir tank according to claims 2, further comprising a plurality of fins fixed to said dividing wall.

5. A reservoir tank according to claim 1, wherein said dividing wall is formed with a through opening at a middle portion thereof and has a substantial heat conductivity.

* * * * *

UNITED STATES PATENT AND TRADEMARK OFFICE
CERTIFICATE OF CORRECTION

PATENT NO. : 4,794,883
DATED : 3 January 1989
INVENTOR(S) : Kashirou FUKAMI et al.

It is certified that error appears in the above-identified patent and that said Letters Patent is hereby corrected as shown below:

| Column | Line | |
|---|---|---|
| ABSTRACT | 12 | After "as" insert --it is--. |
| 1 | 27 | After "engine" insert --cooling fan system. If the temperature of the propellant hydraulic--. |
| 2 | 2 | Change "in" to --is--. |
| 2 | 48 | Change "prcticable" to --practicable--. |
| 3 | 64 | Change "raises" to --rises--. |
| 4 | 41 | Change "porpellant" to --propellant--. |
| 5 | 21 | Change "by" to --since there is--. |
| 5 | 22 | After "resistance" insert --to the--. |
| 7 | 7 | Change "of" to --to--. |
| 7 | 8 | Change "performing" to --perform--. |
| 7 | 34 | After "fluid" insert --separate--. |

UNITED STATES PATENT AND TRADEMARK OFFICE
CERTIFICATE OF CORRECTION

PATENT NO. : 4,794,883

DATED : 3 January 1989

INVENTOR(S) : Kashirou FUKAMI et al.

It is certified that error appears in the above-identified patent and that said Letters Patent is hereby corrected as shown below:

| Column | Line | |
|---|---|---|
| 7 | 35 | After "positioned" delete "on". |

Signed and Sealed this

Twenty-fifth Day of July, 1989

Attest:

DONALD J. QUIGG

Attesting Officer

Commissioner of Patents and Trademarks